United States Patent
Cho et al.

(10) Patent No.: US 11,634,818 B2
(45) Date of Patent: Apr. 25, 2023

(54) SOLUTION COMPOSITION CONTAINING TRIVALENT CHROMIUM FOR SURFACE TREATMENT OF STEEL SHEET, GALVANIZED STEEL SHEET SURFACE—TREATED WITH SAME, AND METHOD FOR MANUFACTURING GALVANIZED

(71) Applicant: POSCO, Pohang-si (KR)

(72) Inventors: Soo-Hyoun Cho, Pohang-si (KR); Won-Ho Son, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 402 days.

(21) Appl. No.: 16/763,363

(22) PCT Filed: Nov. 13, 2018

(86) PCT No.: PCT/KR2018/013812
§ 371 (c)(1),
(2) Date: May 12, 2020

(87) PCT Pub. No.: WO2019/093861
PCT Pub. Date: May 16, 2019

(65) Prior Publication Data
US 2020/0291527 A1 Sep. 17, 2020

(30) Foreign Application Priority Data
Nov. 13, 2017 (KR) .......................... 10-2017-0150367

(51) Int. Cl.
C23C 22/42 (2006.01)
C23C 2/26 (2006.01)
(Continued)

(52) U.S. Cl.
CPC ................ *C23C 22/42* (2013.01); *C23C 2/26* (2013.01); *C23C 2/40* (2013.01); *C23C 22/47* (2013.01);
(Continued)

(58) Field of Classification Search
None
See application file for complete search history.

(56) References Cited

U.S. PATENT DOCUMENTS

| 2004/0173289 A1 | 9/2004 | Kinoshita et al. |
| 2007/0023104 A1 | 2/2007 | Yamamoto et al. |

(Continued)

FOREIGN PATENT DOCUMENTS

| CN | 104451645 A | 3/2015 |
| JP | 06173027 | 6/1994 |

(Continued)

OTHER PUBLICATIONS

International Search Report—PCT/KR2018/013812 dated Feb. 15, 2019.

*Primary Examiner* — Colin W. Slifka
(74) *Attorney, Agent, or Firm* — Cantor Colburn LLP

(57) ABSTRACT

A surface treatment solution composition for forming an inorganic film, comprising: 10 to 30% by weight of a trivalent chromium compound containing chromium phosphate (A) and chromium nitrate (B) and satisfying a content ratio A/(A+B) of 0.3 to 0.6; 5 to 50% by weight of a silane compound; 0.2 to 3% by weight of a vanadium-based rust-inhibiting and corrosion-resisting agent; 0.5 to 5% by weight of a cobalt-based rust-inhibiting and corrosion-resisting agent; and 12 to 84.3% by weight of water, an alloyed hot-dip galvanized steel sheet surface-treated using the composition, and a method for manufacturing the alloyed hot-dip galvanized steel sheet, are provided, and the surface
(Continued)

treatment solution composition containing the trivalent chromium compound has an excellent effect on corrosion resistance, blackening resistance, fuel resistance, weldability, and alkali resistance.

13 Claims, 1 Drawing Sheet

(51) Int. Cl.
  *C23C 2/40* (2006.01)
  *C23C 22/47* (2006.01)
  *C23C 22/73* (2006.01)
  *C23C 22/82* (2006.01)
  *C23C 28/00* (2006.01)

(52) U.S. Cl.
  CPC .............. *C23C 22/73* (2013.01); *C23C 22/82* (2013.01); *C23C 28/00* (2013.01); *C23C 2222/10* (2013.01)

(56) References Cited

U.S. PATENT DOCUMENTS

| | | |
|---|---|---|
| 2018/0187313 A1 | 7/2018 | Shoji et al. |
| 2019/0264333 A1 | 8/2019 | Cho et al. |
| 2019/0264334 A1 | 8/2019 | Cho et al. |

FOREIGN PATENT DOCUMENTS

| | | |
|---|---|---|
| JP | 2002069660 | 3/2002 |
| JP | 2005206872 | 8/2005 |
| JP | 2009127057 | 6/2009 |
| JP | 2009132952 | 6/2009 |
| KR | 20040046347 | 6/2004 |
| KR | 20050052215 | 6/2005 |
| KR | 100535769 | 12/2005 |
| KR | 20060123628 | 12/2006 |
| KR | 20100106031 | 10/2010 |
| KR | 101674818 B1 | 11/2016 |
| KR | 101786358 | 10/2017 |
| KR | 101786392 | 10/2017 |
| TW | 552316 B | 9/2003 |
| WO | 2017038786 | 3/2017 |

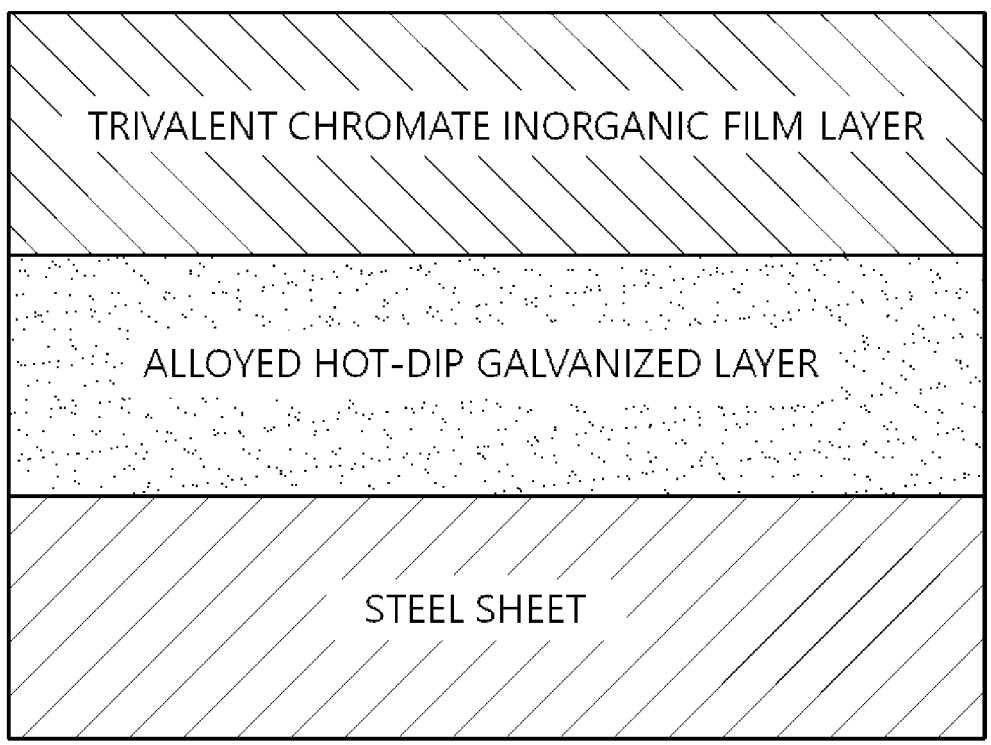

SOLUTION COMPOSITION CONTAINING TRIVALENT CHROMIUM FOR SURFACE TREATMENT OF STEEL SHEET, GALVANIZED STEEL SHEET SURFACE—TREATED WITH SAME, AND METHOD FOR MANUFACTURING GALVANIZED

TECHNICAL FIELD

The present disclosure relates to a surface treatment solution composition containing a trivalent chromium compound, an alloyed hot-dip galvanized steel sheet surface-treated using the composition, and a method for manufacturing the alloyed hot-dip galvanized steel sheet.

BACKGROUND ART

A hot-dip galvanized material, comprising an alloyed galvanized layer, is widely used as a material for automobile components such as fuel tanks for motorcycles and cars due to not only having excellent corrosion resistance due to the protective effect of the base iron by the sacrificed protection, but also having excellent welding characteristics by a zinc-iron alloy phase, compared to the pure galvanized layer.

However, the alloyed hot-dip galvanized material may have an exposed surface formed of zinc and a zinc-iron alloy phase. Therefore, when exposed to a normal environment, especially a wet atmosphere, white rust may occur on the surface to easily deteriorate quality characteristics of the material. In addition, when the alloyed hot-dip galvanized material is exposed to a high-temperature and high-humidity environment, there is a problem in which a surface color thereof may be changed to black, i.e., a blackening phenomenon may easily occur.

In order to solve such problems, conventionally, corrosion resistance and blackening resistance have been secured by applying a hexavalent chromium treatment to an alloyed hot-dip galvanized steel sheet. However, since hexavalent chromium has been designated as an environmentally hazardous substance, regulations for the use of hexavalent chromium are now being strengthened, and the use thereof is restricted. Furthermore, when using hexavalent chromium as a surface treating agent for a hot-dip galvanized steel sheet, there may be a problem in which a surface of the hot-dip galvanized steel sheet is blackened, or black spots may be generated thereon. In addition, in the case of products that require relatively high corrosion resistance and fuel resistance characteristics, such as a fuel tank steel sheet for vehicles, when exposed to more severe corrosion environments due to fuel and condensate in the fuel, corrosion prevention effects may be insufficient to cause serious problems such as a vehicle stop or the like during a vehicle operation.

In order to solve the environmental hazard problem of hexavalent chromium, a method of securing corrosion resistance and blackening resistance of a galvanized steel sheet by coating a surface treatment solution composition containing trivalent chromium on a steel sheet has recently been applied. For example, in Korean Patent Publication Nos. 10-2006-0123628, 10-2005-0052215, and 10-2010-0106031, corrosion resistance and blackening resistance properties may be secured by a method in which a steel sheet is immersed in a composition containing trivalent chromium to perform a chemical conversion treatment. However, there may be a problem in which it takes a relatively long time to immerse the steel sheet in the continuous process of the steelmaker, and the chemical conversion treatment may have deteriorated fingerprint resistance, or the like.

In addition, in Korean Patent Publication No. 10-2004-0046347 and Japanese Patent Publication No. 2002-069660, a composition containing trivalent chromium may be coated on a steel sheet by a spray or roll coating method. Therefore, such methods may be applied in the continuous process of the steelmaker, and may have fingerprint resistance. However, since the composition contains a porous silica component, it may be highly discolored in a relatively wet atmosphere. Further, since the porous silica has high hygroscopic properties, a problem in which discoloration may rapidly occur in alloyed hot-dip galvanized steel sheets.

On the other hand, the present inventors have confirmed that, in a case of forming a film on a steel sheet for a fuel tank, when the film contains an organic component such as a urethane resin, a problem in which a corrosion prevention effect due to condensate water in the fuel tank decreases also occurs. In addition, in manufacturing the fuel tank, since the container for the fuel tank is manufactured by welding, the weldability should be excellent, but such an organic component may cause a problem of significantly degrading the weldability. Furthermore, it was confirmed that such a resin component may be dissolved in the fuel during long-term contact with fuel, to deteriorate fuel resistance of the film.

Therefore, there is an urgent need to form a film excellent in fuel resistance, corrosion resistance, weldability, and workability by forming an inorganic film containing no organic components on a steel sheet for a fuel tank.

DISCLOSURE

Technical Problem

An aspect of the present disclosure may provide a surface treatment solution composition, which may not contain hexavalent chromium, an environmentally hazardous substance, and which may contain trivalent chromium and an inorganic compound as main components, harmless to the human body, and may provide a surface-treated alloyed hot-dip galvanized steel sheet, having an excellent effect on corrosion resistance, blackening resistance, fuel resistance, weldability, and alkali resistance, by applying the solution composition to a surface of a zinc-based plated steel sheet.

Technical Solution

According to an aspect of the present disclosure, a surface treatment solution composition for forming an inorganic film, includes: 10 to 30% by weight of a trivalent chromium compound containing chromium phosphate (A) and chromium nitrate (B) and satisfying a content ratio A/(A+B) of 0.3 to 0.6 (based on a solution having a solid content of 28.6% by weight); 5 to 50% by weight of a silane compound (based on a solution having a solid content of 1.27% by weight); 0.2 to 3% by weight of a vanadium-based rust-inhibiting and corrosion-resisting agent; 0.5 to 5% by weight of a cobalt-based rust-inhibiting and corrosion-resisting agent; and 12 to 84.3% by weight of water.

The vanadium-based rust-inhibiting and corrosion-resisting agent may be one or more selected from the group consisting of vanadium pentoxide ($V_2O_5$), metavanadium acid ($HVO_3$), ammonium metavanadate, sodium metavanadate, vanadium oxychloride ($VOCl_3$), vanadium trioxide ($V_2O_3$), vanadium dioxide ($VO_2$), vanadium oxysulfate ($VOSO_4$), vanadium oxyoxalate [$VO(COO)_2$], vanadium oxyacetyl acetonate [$VO(OC(CH_3)=CHCOCH_3))_2$], vanadium acetyl acetonate [V(OC(CH$_3$)=CHCOCH$_3$))$_3$], vanadium trichloride (VCl$_3$), vanadium sulfate (VSO$_4$.8H$_2$O), vanadium dichloride (VCl$_2$), and vanadium oxide (VO).

The cobalt-based rust-inhibiting and corrosion-resisting agent may be one or more selected from the group consisting of cobalt (II) nitrate, cobalt (II) sulfate, cobalt (II) acetate, cobalt (II) oxalate, cobalt (III) nitrate, cobalt (III) acetate, cobalt (III) oxalate, cobalt (IV) chloride, cobalt (III) oxide, and cobalt (IV) oxide.

According to an aspect of the present disclosure, a surface-treated alloyed hot-dip galvanized steel sheet includes: an alloyed hot-dip galvanized layer formed on at least one surface of a steel sheet; and a trivalent chromate inorganic film layer formed on the alloyed hot-dip galvanized layer, wherein the trivalent chromate inorganic film layer includes: 49.8 to 78.9% by weight of a trivalent chromium compound containing chromium phosphate (A) and chromium nitrate (B) and satisfying a content ratio A/(A+B) of 0.80 to 0.98; 1.8 to 3.7% by weight of a silane compound; 5.5 to 17.5% by weight of a vanadium-based rust-inhibiting and corrosion-resisting agent; and 13.8 to 29% by weight of a cobalt-based rust-inhibiting and corrosion-resisting agent.

The silane compound may be one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureidopropyl trimethoxysilane, and tetraethyl orthosilicate.

The vanadium-based rust-inhibiting and corrosion-resisting agent may be one or more selected from the group consisting of vanadium pentoxide (V$_2$O$_5$), metavanadium acid (HVO$_3$), ammonium metavanadate, sodium metavanadate, vanadium oxychloride (VOCl$_3$), vanadium trioxide (V$_2$O$_3$), vanadium dioxide (VO$_2$), vanadium oxysulfate (VOSO$_4$), vanadium oxyoxalate [VO(COO)$_2$], vanadium oxyacetyl acetonate [VO(OC(CH$_3$)=CHCOCH$_3$))$_2$], vanadium acetyl acetonate [V(OC(CH$_3$)=CHCOCH$_3$))$_3$], vanadium trichloride (VCl$_3$), vanadium sulfate (VSO$_4$.8H$_2$O), vanadium dichloride (VCl$_2$), and vanadium oxide (VO).

The cobalt-based rust-inhibiting and corrosion-resisting agent may be one or more selected from the group consisting of cobalt (II) nitrate, cobalt (II) sulfate, cobalt (II) acetate, cobalt (II) oxalate, cobalt (III) nitrate, cobalt (III) acetate, cobalt (III) oxalate, cobalt (IV) chloride, cobalt (III) oxide, and cobalt (IV) oxide.

The trivalent chromate inorganic film layer may have a thickness of 0.3 to 0.5 μm.

According to an aspect of the present disclosure, a manufacturing method for a surface-treated alloyed hot-dip galvanized steel sheet, includes: coating the surface treatment solution composition on an alloyed hot-dip galvanized steel sheet on which an alloyed hot-dip galvanized layer is formed; and drying the coated surface treatment solution composition to form a trivalent chromate inorganic film layer.

The surface treatment solution composition may be coated to have a thickness of 2.14 to 3.57 μm.

The coating may be performed by any one process selected from the group consisting of a roll coating process, a spraying process, an immersion process, a spray squeezing process, and an immersion squeezing process.

The drying may be performed at a temperature of 50 to 60° C. on the basis of a Peak Metal Temperature (PMT) of a steel sheet.

The drying may be performed in a hot-air drying furnace or an induction heating furnace.

The hot-air drying furnace may have an internal temperature of 100 to 200° C.

The induction heating furnace may be applied with an electric current of 1000 to 3500 A.

The manufacturing method for a surface-treated alloyed hot-dip galvanized steel sheet may further include air-cooling the trivalent chromate inorganic film layer.

The manufacturing method for a surface-treated alloyed hot-dip galvanized steel sheet may be a continuous process, wherein the continuous process may have a speed of 80 to 100 mpm.

Advantageous Effects

According to an aspect of the present disclosure, the alloyed hot-dip galvanized steel sheet surface-treated with the surface treatment solution composition containing trivalent chromium and an inorganic compound may have an excellent effect on corrosion resistance, blackening resistance, fuel resistance, weldability, and alkali resistance.

DESCRIPTION OF DRAWINGS

FIG. 1 is a view schematically illustrating a cross-sectional structure of a steel sheet according to the present disclosure.

BEST MODE FOR INVENTION

Hereinafter, preferred embodiments of the present disclosure will be described with reference to various embodiments. However, embodiments of the present disclosure may be modified into various other embodiments, and the scope of the present disclosure is not limited to embodiments described below.

The present disclosure relates to a surface treatment solution composition for forming an inorganic film of a fuel tank steel sheet, containing trivalent chromium, an alloyed hot-dip galvanized steel sheet surface-treated using the composition, and a method for manufacturing the alloyed hot-dip galvanized steel sheet.

The surface treatment solution composition according to an embodiment of the present disclosure may include a trivalent chromium compound, a silane compound, a vanadium-based rust-inhibiting and corrosion-resisting agent, a cobalt-based rust-inhibiting and corrosion-resisting agent and water.

A surface treatment solution composition according to an embodiment of the present disclosure is to provide excellent corrosion resistance, blackening resistance, fuel resistance, weldability, and alkali resistance of an alloyed hot-dip galvanized steel sheet by using trivalent chromium. In addition, a surface treatment solution composition of the present disclosure does not contain hexavalent chromium, which may be an environmentally hazardous substance, and does not contain an organic component, which may deteriorate fuel resistance and weldability, and contains a trivalent chromium harmless to the human body as a main component, to prevent problems of damage to the human body and environmental pollution.

The trivalent chromium compound may be a component contained in the surface treatment solution composition of the present disclosure as a main component, may have a self-healing effect and self-lubricating properties similar to hexavalent chromium, and may function to secure corrosion resistance and blackening resistance.

The trivalent chromium compound contained in the composition of the present disclosure may include chromium phosphate and chromium nitrate. The chromium phosphate may have a function of providing corrosion resistance, and the chromium nitrate may have a function of providing blackening resistance. Therefore, the present disclosure may use the chromium phosphate (A) and chromium nitrate (B) in a range in which A/(A+B) satisfies 0.3 to 0.6. As a ratio of the chromium phosphate increases, corrosion resistance may be improved, but blackening resistance may be deteriorated. As a ratio of chromium nitrate increases, blackening resistance may be improved, but corrosion resistance may be deteriorated.

Specifically, when the inorganic film is formed on a surface of the steel sheet with the chromium phosphate, a phosphoric acid component may not be volatilized. Therefore, a chromium phosphate film may be formed on a surface of the inorganic film, and corrosion resistance may be improved. Blackening resistance of the chromium phosphate may be deteriorated due to a hygroscopic property of the chromium phosphate. When the film is formed on a surface of the steel sheet with the chromium nitrate, a nitric acid component may be mostly volatilized and may not affect blackening resistance. As the content of chromium nitrate increases, the film of chromium phosphate may barely be formed on a surface of the film, and corrosion resistance may be deteriorated.

Therefore, according to an embodiment of the present disclosure, a content ratio A/(A+B) of the chromium phosphate (A) and the chromium nitrate (B) may satisfy 0.3 to 0.6. When the content ratio is less than 0.3, corrosion resistance may be deteriorated after processing. When the content ratio exceeds 0.6, blackening resistance may be deteriorated.

The total content of the trivalent chromium compound containing chromium phosphate and chromium nitrate may be 10 to 30% by weight, based on a solution having a solid content of 28.6% by weight. When the content of the trivalent chromium compound is less than 10% by weight, a firm and insoluble film layer may become thinner. Therefore, since it may be difficult to effectively block penetration of moisture through a surface of the plated steel sheet requiring corrosion resistance, blackening may occur and corrosion resistance may also be deteriorated.

When the content of the trivalent chromium compound exceeds 30% by weight, the content of the vanadium-based rust-inhibiting and corrosion-resisting agent to be added for improving corrosion resistance, the content of the cobalt-based rust-inhibiting and corrosion-resisting agent, and the content of the silane coupling agent serving as a binder may be relatively decreased. Therefore, there may be a problem in which it is difficult to secure sufficient corrosion resistance and blackening resistance.

The surface treatment solution composition of the present disclosure may include a silane coupling agent. The silane coupling agent may be added to crosslink the inorganic component and the organic component to promote drying and to ensure high corrosion resistance.

The type of the silane coupling agent is not particularly limited, and, for examples, may be one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureidopropyl trimethoxysilane, and tetraethyl orthosilicate. These silane coupling agents may be used alone, or may be used by mixing two or more.

The content of the silane coupling agent may be 5 to 50% by weight (based on a solution having a solid content of 1.27% by weight). When the content of the silane coupling agent is less than 5% by weight, alkali resistance and fuel resistance may be deteriorated. When the content of the silane coupling agent exceeds 50% by weight, the film may become too dry to form an excessively hard film. Therefore, processed part corrosion resistance may be deteriorated, and fuel resistance after processing may be deteriorated.

A surface treatment solution composition of the present disclosure may include a vanadium-based rust-inhibiting and corrosion-resisting agent. The vanadium-based rust-inhibiting and corrosion-resisting agent may be a component included to improve corrosion resistance of the plated steel sheet by forming a passive inorganic film on the surface of the alloyed hot-dip galvanized steel sheet surface-treated with the surface treatment solution composition of the present disclosure. When the vanadium-based rust-inhibiting and corrosion-resisting agent is damaged in the film, for example, the tetravalent vanadium in the film existing near a damaged site may be eluted and reduced to trivalent, while the passive inorganic film may be exposed on the plated surface exposed by the damage, to have an effect of inhibiting corrosion. In addition, the vanadium-based rust-inhibiting and corrosion-resisting agent may be eluted preferentially in a corrosive environment, and suppresses an increase in pH due to dissolution of the plating component, to improve corrosion resistance.

Examples of the vanadium-based rust-inhibiting and corrosion-resisting agent may include vanadium pentoxide ($V_2O_5$), metavanadium acid ($HVO_3$), ammonium metavanadate, sodium metavanadium, vanadium oxychloride ($VOCl_3$), vanadium trioxide ($V_2O_3$), vanadium dioxide ($VO_2$), vanadium oxysulfate ($VOSO_4$), vanadium oxyoxalate [$VO(COO)_2$], vanadium oxyacetyl acetonate [$VO(OC(CH_3)=CHCOCH_3))_2$], vanadium acetyl acetonate [$V(OC(CH_3)=CHCOCH_3))_3$], vanadium trichloride ($VCl_3$), vanadium sulfate ($VSO_4.8H_2O$), vanadium dichloride ($VCl_2$), and vanadium oxide ($VO$), and may be used alone, or may be used by mixing two or more.

The content of the vanadium-based rust-inhibiting and corrosion-resisting agent may be 0.2 to 3% by weight. When the content of the vanadium-based rust-inhibiting and corrosion-resisting agent is less than 0.2% by weight, there may be a problem in which it is difficult to secure corrosion resistance. When the content of the vanadium-based rust-inhibiting and corrosion-resisting agent exceeds 3% by weight, there may be a problem in which it is difficult to secure blackening resistance and alkali resistance.

A surface treatment solution composition of the present disclosure also includes a cobalt-based rust-inhibiting and corrosion-resisting agent. The cobalt-based rust-inhibiting and corrosion-resisting agent may react with a plated layer on a surface of an alloyed hot-dip galvanized steel sheet surface-treated with the surface treatment solution composition of the present disclosure, to modify a surface of the plated layer, to improve blackening resistance of the coated steel sheet. In addition, even when an acidic liquid passes through the inorganic film and reaches the surface of the plated layer, the cobalt compound may protect the surface of the plated layer and may suppress discoloration. In addition, the cobalt-based rust-inhibiting and corrosion-resisting agent may form an insoluble salt together with a phosphate group included in the surface treatment solution composition, to have an effect of contributing to improvement of corrosion resistance of the alloyed hot-dip galvanized steel sheet.

Examples of the cobalt-based rust-inhibiting and corrosion-resisting agent may include cobalt (II) nitrate, cobalt (II) sulfate, cobalt (II) acetate, cobalt (II) oxalate, cobalt (III) nitrate, cobalt (III) acetate, cobalt (III) oxalate, cobalt (IV) chloride, cobalt (III) oxide, cobalt (IV) oxide, and the like, and may be used alone, or may be used by mixing two or more.

The content of the cobalt-based rust-inhibiting and corrosion-resisting agent may be 0.5 to 5% by weight. When the content of the cobalt-based rust-inhibiting and corrosion-resisting agent is less than 0.5% by weight, there may be a problem in that it is difficult to secure blackening resistance. When the content of the cobalt-based rust-inhibiting and corrosion-resisting agent exceeds 5% by weight, there may be problems that an effect of improving blackening resistance is insignificant, and corrosion resistance is greatly deteriorated.

A surface treatment solution composition of the present disclosure may include water. The water may be a solvent of the surface treatment solution composition of the present disclosure, and may be used to dilute components of the surface treatment solution composition. The water is not particularly limited, but deionized water or distilled water may be used. The water may be included as a balance in addition to each component of the present disclosure, the content of the water may be 12 to 84.3% by weight.

According to another embodiment of the present disclosure, an alloyed hot-dip galvanized steel sheet surface-treated by the above-described surface treatment solution composition containing the trivalent chromium, and a method for manufacturing the same may be provided.

Specifically, the surface-treated alloyed hot-dip galvanized steel sheet may include a base steel sheet, an alloyed hot-dip galvanized layer formed on at least one surface of the base steel sheet, and a trivalent chromate inorganic film layer formed on the alloyed hot-dip galvanized layer.

The trivalent chromate inorganic film layer may include a trivalent chromium compound, a silane compound, a vanadium-based rust-inhibiting and corrosion-resisting agent, and a cobalt-based rust-inhibiting and corrosion-resisting agent, and may not contain other organic components.

The trivalent chromate inorganic film layer may be an inorganic film layer formed by the above-described surface treatment solution composition, may correspond to components remaining in the surface of the steel sheet, and contents thereof, after volatile components such as a solvent contained in the surface treatment solution composition are all volatilized, and may correspond to amounts based on 100 wt % of the total solids content.

The trivalent chromate inorganic film layer of the present disclosure may contain a trivalent chromium compound as a main component. The trivalent chromium compound may contain chromium phosphate and chromium nitrate, and the content may be 49.8 to 78.9% by weight, based on solids. When the content of the trivalent chromium compound is less than 49.8% by weight, a firm and insoluble film layer may become thinner. Therefore, since it may be difficult to effectively block penetration of moisture through a surface of the plated steel sheet requiring corrosion resistance, blackening may be caused and corrosion resistance may also be deteriorated. When the content of the trivalent chromium compound exceeds 78.9% by weight, the content of the vanadium-based rust-inhibiting and corrosion-resisting agent to be added for improving corrosion resistance, the content of the cobalt-based rust-inhibiting and corrosion-resisting agent, and the content of the silane coupling agent serving as a binder may be relatively decreased. Therefore, there may be a problem in which it is difficult to secure sufficient corrosion resistance and blackening resistance.

In addition, a content ratio A/(A+B) of the chromium phosphate (A) and the chromium nitrate (B) may be 0.80 or more and 0.98 or less, and more preferably 0.89 to 0.95. When the content ratio is less than 0.80, corrosion resistance may be deteriorated after processing. When the content ratio exceeds 0.98, blackening resistance may be deteriorated.

The trivalent chromate inorganic film layer of the present disclosure may contain a silane compound. The content of the silane compound may be 1.8 to 3.7% by weight, based on solids. When the content of the silane compound is less than 1.8% by weight, alkali resistance and piping oil infiltration may be deteriorated. When the content of the silane compound exceeds 3.7% by weight, the film may become too dry to form an excessively hard film. Therefore, it is not preferable because processed part corrosion resistance may be deteriorated, and fuel resistance may be deteriorated.

A trivalent chromate inorganic film layer of the present disclosure may contain a vanadium-based rust-inhibiting and corrosion-resisting agent. The content of the vanadium-based rust-inhibiting and corrosion-resisting agent may be 5.5 to 17.5% by weight, based on solids. When the content of the vanadium-based rust-inhibiting and corrosion-resisting agent is less than 5.5% by weight, there may be a problem in which it is difficult to secure corrosion resistance. When the content of the vanadium-based rust-inhibiting and corrosion-resisting agent exceeds 17.5% by weight, there may be a problem in which it is difficult to secure blackening resistance and alkali resistance.

A trivalent chromate inorganic film layer of the present disclosure may contain a cobalt-based rust-inhibiting and corrosion-resisting agent. The content of the cobalt-based rust-inhibiting and corrosion-resisting agent may be 13.8 to 29% by weight, based on solids. When the content of the cobalt-based rust-inhibiting and corrosion-resisting agent is less than 13.8% by weight, there may be a problem in that it is difficult to secure blackening resistance. When the content of the cobalt-based rust-inhibiting and corrosion-resisting agent exceeds 29% by weight, there may be problems that an effect of improving blackening resistance is insignificant, and corrosion resistance is greatly deteriorated.

According to an embodiment of the present disclosure, preparing a galvanized steel sheet on which a galvanized layer is formed, coating a surface treatment solution composition on an alloyed hot-dip galvanized steel sheet; and drying the coated surface treatment solution composition to form a trivalent chromate inorganic film layer.

The surface treatment solution composition may contain 10 to 30% by weight of a trivalent chromium compound containing chromium phosphate (A) and chromium nitrate (B) and satisfying a content ratio A/(A+B) of 0.3 to 0.6 (based on a solution having a solid content of 28.6% by weight); 5 to 50% by weight of a silane compound (based on a solution having a solid content of 1.27% by weight); 0.2 to 3% by weight of a vanadium-based rust-inhibiting and corrosion-resisting agent; 0.5 to 5% by weight of a cobalt-based rust-inhibiting and corrosion-resisting agent; and 12 to 84.3% by weight of water. The technical meaning of the content range of each component contained in the surface treatment solution composition may be the same as described above.

According to an embodiment of the present disclosure, the surface treatment solution composition may be coated to a thickness of 2.14 m to 3.57 μm. The surface treatment solution composition coated to such a thickness may be a thickness of the dried coating layer of 0.3 m to 0.5 μm by the drying operation. When a thickness of the surface treatment solution composition is less than 2.14 μm, there may arise a problem in which the surface treatment solution composition may be applied thinly on the peak portion of the roughness of the steel sheet to deteriorate corrosion resistance. When a thickness of the surface treatment solution composition exceeds 3.57 μm, there may arise a problem in which weldability, workability, and the like, may be deteriorated due to formation of thick film layer.

The method of coating the surface treatment solution composition is not particularly limited as long as it is a commonly used coating method. For example, any one coating method selected from a roll coating process, a spraying process, an immersion process, a spray squeezing process, and an immersion squeezing process may be performed.

The drying the surface treatment solution composition coated on the alloyed hot-dip galvanized steel sheet may be performed at a temperature of 50° C. to 60° C. on the basis of a Peak Metal Temperature (PMT) of a steel sheet. When the drying temperature is less than 50° C. on the basis of a Peak Metal Temperature (PMT) of a steel sheet, the drying may not be performed perfectly, and alkali resistance and piping oil infiltration may be deteriorated. When the drying temperature exceeds 60° C., the steel sheet may be not sufficiently cooled during the cooling process (air cooling) in air, and blackening resistance may be deteriorated due to the condensation phenomenon by a packaging operation.

The drying operation may be carried out in a hot-air drying furnace or an induction heating furnace. When the surface treatment solution composition is dried using the hot-air drying furnace, the hot-air drying furnace may have an internal temperature of 100° C. to 200° C. When the surface treatment solution composition is dried using the induction heating furnace, an electric current applied to the induction heating furnace may be 1,000 A to 3,500 A, and is more preferably 1,500 A to 3,000 A.

When an internal temperature of the hot-air drying furnace is less than 100° C. or the electric current applied to the induction heating furnace is less than 1,000 A, the surface treatment solution composition may not be completely dried, and alkali resistance and piping oil infiltration may be deteriorated. When an internal temperature of the hot-air drying furnace exceeds 200° C. or the electric current applied to the induction heating furnace exceeds 3,500 A, the steel sheet may be not sufficiently cooled during the cooling process (air cooling) in air, and blackening resistance may be deteriorated due to the condensation phenomenon by a packaging operation.

In addition, an alloyed hot-dip galvanized steel sheet, which is finally surface-treated by drying the surface treatment solution composition to form a trivalent chromate film layer and air-cooling the trivalent chromate film layer, may be provided.

A manufacturing method for a surface-treated alloyed hot-dip galvanized steel sheet according to an embodiment of the present disclosure may be a continuous process, and a speed of the continuous process may be 80 to 100 mpm. When a speed of the continuous process is less than 80 mpm, a problem in which productivity is reduced may occur. When a speed of the continuous process exceeds 100 mpm, a solution may be scattered in the drying operation of the surface treatment solution composition for steel sheet, and thereby surface defects may occur.

In the present disclosure, a steel sheet may be a galvanized steel sheet having a galvanized layer. The galvanized steel sheet is not particularly limited, but is more preferably applied to an alloyed hot-dip galvanized steel sheet.

MODE FOR INVENTION

EXAMPLE

Hereinafter, the present disclosure will be described more specifically with reference to specific examples. The following examples are provided to aid understanding of the present disclosure, and the scope of the present disclosure is not limited thereto.

Example 1

Change in Properties Depending on Content of Trivalent Chromium Compound

A surface treatment solution composition containing trivalent chromium including: a trivalent chromium compound produced by adding chromium phosphate and chromium nitrate to distilled water, reacting them at 80° C. for 1 hour, and cooling them to room temperature; vanadium acetyl acetonate as a vanadium-based rust-inhibiting and corrosion-resisting agent; cobalt (III) nitrate as a cobalt-based rust-inhibiting and corrosion-resisting agent; a mixture of tetraethyl orthosilicate and 3-glycidoxypropyl trimethoxysilane in a weight ratio of 1:1 as a silane coupling agent; and water, and mixed in the amounts illustrated in Table 2 below (based on the solids content of the composition), was prepared.

In the following examples, cases in which the surface treatment solution composition according to the present disclosure satisfies the specified content range illustrated in Table 1 below were described as Inventive Examples, and cases in which one or more components do not satisfy the specified content range illustrated in Table 1 were described as Comparative Examples.

A hot-dip galvanized steel sheet was cut to have a size of 7 cm×15 cm (width×length), and oil was removed therefrom. Then, the prepared surface treatment solution composition was bar-coated on the hot-dip galvanized steel sheet in a dry film layer thickness of 0.4 μm. Subsequently, the steel sheet coated with the surface treatment solution composition was completely dried using a hot-air drying furnace under conditions of PMT 60° C., to prepare a specimen having a trivalent chromate inorganic film, as illustrated in FIG. 1.

Flat sheet corrosion resistance, processed part corrosion resistance, and blackening resistance of the prepared specimens were evaluated. The evaluation results are presented in Table 2 below. The evaluation methods for flat sheet corrosion resistance, processed part corrosion resistance, and blackening resistance were as follows.

<Flat Sheet Corrosion Resistance>

Based on the method specified in ASTM B117, the rate of occurrence of white rust in the steel sheet was measured over time after the specimens were treated. The evaluation criteria are as follows:

⊚: 144 hours or more of white rust occurrence time

○: 96 hours or more and less than 144 hours of white rust occurrence time

Δ: 55 hours or more and less than 96 hours of white rust occurrence time

×: Less than 55 hours of white rust occurrence time

<Processed Part Corrosion Resistance>

The specimens were pushed up to a height of 6 mm using an Erichsen tester, and a frequency of occurrence of white rust was measured after 24 hours. The evaluation criteria are as follows:

⊚: Less than 5% frequency of occurrence of white rust after 48 hours

Δ: 5% or more and less than 7% frequency of occurrence of white rust after 48 hours ×: Greater than 7% frequency of occurrence of white rust after 48 hours <Blackening Resistance>

The color change (color difference: ΔE) of the specimens before and after the test was observed by allowing the specimens in an air-conditioning equipment maintaining at 50° C. and a relative humidity of 95% for 120 hours. The evaluation criteria are as follows:

⊚: ΔE≤2
○: 2<ΔE≤3
Δ: 3<ΔE≤4
×: ΔE>4

As illustrated in Table 2 above, when the content of the trivalent chromium compound satisfied the content proposed by the present disclosure (Inventive Examples 1 to 4), all of the properties exhibited good or higher results.

Meanwhile, when the trivalent chromium compound was added in a relatively small amount (Comparative Example 1), flat sheet corrosion resistance, processed part corrosion resistance, and blackening resistance exhibited poor results. When the trivalent chromium compound was added in a relatively larger amount (Comparative Example 2), all of the properties, except for blackening resistance, exhibited poor results.

Example 2

Changes in Properties Depending on Ratios of Chromium Phosphate (III) and Chromium Nitrate (III)

The trivalent chromium surface treatment solution composition according to Inventive Example 3 was used in the same manner as in Example 1 to prepare hot-dip galvanized steel sheet specimens in which a trivalent chromate inorganic film was formed, except that a ratio of chromium phosphate (III) and chromium nitrate (III) was controlled to be the ratio of chromium phosphate and chromium nitrate illustrated in Table 3 below.

TABLE 1

| Range of Composition | Content (wt %) Min. | Content (wt %) Max. | Solid Content (wt %) | Component After Drying (wt %) Min. | Component After Drying (wt %) Max. | Component in Dry Film (wt %) Min. | Component in Dry Film (wt %) Max. |
|---|---|---|---|---|---|---|---|
| $Cr^{3+}$ Compound | 10 | 30 | 28.6 | 2.86 | 8.58 | 68.3 | 50.6 |
| Silane Compound | 5 | 50 | 1.27 | 0.13 | 0.38 | 3.1 | 2.2 |
| Vanadium-based Rust-Inhibiting and Corrosion-Resisting Agent | 0.1 | 5 | 100 | 0.2 | 3 | 4.8 | 17.7 |
| Cobalt-based Rust-Inhibiting and Corrosion-Resisting Agent | 0.5 | 7 | 100 | 1 | 5 | 23.9 | 29.5 |
| Water | 78.8 | 32 | 0 | 0 | 0 | 0 | 0 |
| Total | 100 | 100 | — | 4.19 | 16.96 | 100 | 100 |

TABLE 2

| | Composition (wt %) $Cr^{3+}$ Compound | Silane Compound | Rust-Inhibiting and Corrosion-Resisting Agent Vanadium-based | Rust-Inhibiting and Corrosion-Resisting Agent Cobalt-based | Flat Sheet Corrosion Resistance | Processed Part Corrosion Resistance | Blackening Resistance |
|---|---|---|---|---|---|---|---|
| [1]CE 1 | 49.5 | 4 | 17.5 | 29 | × | × | × |
| [2]IE 1 | 49.8 | 3.7 | 17.5 | 29 | ○ | ⊚ | ○ |
| IE 2 | 60 | 2.5 | 11.5 | 26 | ⊚ | ⊚ | ⊚ |
| IE 3 | 68 | 2.5 | 6.5 | 23 | ⊚ | ⊚ | ⊚ |
| IE 4 | 78.5 | 2.5 | 5 | 14 | ○ | ⊚ | ○ |
| CE 2 | 79.2 | 1.8 | 5.2 | 13.8 | × | × | ○ |

[1]CE: Comparative Example,
[2]IE: Inventive Example
*The content of the composition may be based on solid content of 14%.

Flat sheet corrosion resistance and blackening resistance of the prepared specimens were evaluated in the same manner as in Example 1, and the evaluation results are illustrated in Table 3.

TABLE 3

| | Cr³⁺ Compound (wt %) | Content Ratio of Chromium Phosphate and Chromium Nitrate | | | Flat Sheet | |
|---|---|---|---|---|---|---|
| | | Chromium Phosphate (A) | Chromium Nitrate (B) | A/(A + B) | Corrosion Resistance | Blackening Resistance |
| ¹CE 3 | 58.2 | 7 | 0 | 1 | ○ | X |
| CE 4 | 58.2 | 0 | 0.35 | 0 | X | ○ |
| CE 5 | 58.2 | 1 | 0.3 | 0.769 | X | ○ |
| ²IE 5 | 58.2 | 1 | 0.25 | 0.80 | ○ | ◎ |
| IE 6 | 58.2 | 3 | 0.2 | 0.938 | ◎ | ◎ |
| IE 7 | 58.2 | 4.9 | 0.1 | 0.980 | ◎ | ○ |
| CE 6 | 58.2 | 7 | 0.1 | 0.986 | ○ | X |

¹CE: Comparative Example,
²IE: Inventive Example
*The content of the composition may be based on 14% of the solids content.

As illustrated in Table 3 above, corrosion resistance may be improved as a ratio of chromium phosphate is increased, while blackening resistance may be improved as a ratio of chromium nitrate is increased. When the ratio of chromium phosphate to chromium nitrate is less than or more than the ratio of chromium phosphate and chromium nitrate illustrated in the present disclosure, the corrosion resistance or blackening resistance tends to be poor.

Example 3

Changes in Properties Depending on Content and Type of Silane Compound

Hot-dip galvanized steel sheet specimens on which a trivalent chromate inorganic film layer is formed was prepared in the same manner as in Example 1, except that chromium nitrate and chromium phosphate as a trivalent chromium compound; vanadium acetyl acetonate as a vanadium-based rust-inhibiting and corrosion-resisting agent; cobalt (III) nitrate as a cobalt-based rust-inhibiting and corrosion-resisting agent; and a silane mixture of tetraethyl orthosilicate and 3-glycidoxypropyl trimethoxysilane in a weight ratio of 1:1 as a silane coupling agent, were mixed in the amounts illustrated in Table 4 below (based on the solids content of the composition).

Flat sheet corrosion resistance, processed part corrosion resistance, and blackening resistance of the prepared specimens were evaluated in the same manner as in Example 1, and further, alkali resistance, fuel resistance and fingerprint resistance were evaluated as follows, and the evaluation results may be illustrated in Table 4.

<Alkali Resistance>

The specimens were immersed in an alkaline degreasing solution at 60° C. for 2 minutes, washed with water, air dried, and then measured with regard to a difference in color (ΔE) before and after the operations. The alkali degreasing solution was Finecleaner L 4460 A: 20 g/2.4 L+L 4460 B 12 g/2.4 L (pH=12) manufactured by Parkerizing Co., Ltd. The evaluation criteria are as follows:

◎: ΔE≤2
○: 2<ΔE≤3
Δ: 3<ΔE≤4
×: ΔE>4

<Weldability>

Weldability was evaluated by using a pneumatic AC Spot welding machine, and maintaining pressing force of 250 kg, welding time of 15 cycles, and electric current carrying electric current of 7.5 kA without spatter and constant strength. The evaluation criteria are as follows:

○: Weldable
Δ: Poor welding quality
×: Not Weldable

<Fuel Resistance>

Evaluation of fuel resistance was to evaluate high temperature fuel resistance with regard to degraded gasoline and biodiesel. The following degraded gasoline and biodiesel were used for fuel resistance evaluation.

Degraded gasoline: 78.58% by volume of gasoline+20% by volume of ethanol+1.42% by volume of pure water+100 ppm of formic acid+100 ppm of acetic acid Biodiesel: 81% by volume of diesel+9% by volume of BIO diesel+5% by volume of pure water+5% by volume of methanol+20 ppm of formic acid+0.3% by weight of peroxide After the obtained specimen was processed to have a cup shape, each of the fuels was filled, a surface thereof was covered with a glass plate, and the specimen and the glass plate were sealed using an O-ring. Thereafter, after standing at 85° C. for 3 months, corrosion resistance of the steel plate was observed to evaluate fuel resistance. The evaluation criteria are as follows.

◎: 0% of Corrosion Area
○: more than 0% and 5% or less of Corrosion Area
□: more than 5% and 30% or less of Corrosion Area
Δ: greater than 30% and 50% or less of Corrosion Area
×: greater than 50% of Corrosion Area

TABLE 4

| | Composition (wt %) | | | | | | | | | |
|---|---|---|---|---|---|---|---|---|---|---|
| | Silane Compound | $Cr^{3+}$ Compound | Vanadinm-based Rust-Inhibiting and Corrosion-Resisting Agent | Cobalt-based Rust-Inhibiting and Corrosion-Resisting Agent | Alkali Resistance | Fuel Resistance | Weld ability | Flat Sheet Corrosion Resistance | Processed Part Corrosion Resistance | Blackening Resistance |
| [1]CE 7 | 1.7 | 60 | 13.8 | 24.5 | X | X | ○ | ○ | ◎ | ○ |
| [2]IE 8 | 1.8 | 60 | 13.8 | 24.4 | ○ | ○ | ○ | ◎ | ◎ | ○ |
| IE 9 | 2.5 | 60 | 13.3 | 24.2 | ○ | ◎ | ◎ | ◎ | ◎ | ◎ |
| IE 10 | 3.1 | 60 | 13.5 | 23.4 | ◎ | ◎ | ◎ | ◎ | ◎ | ◎ |
| IE 11 | 3.7 | 60 | 13.6 | 22.7 | ◎ | ○ | ◎ | ◎ | ◎ | ○ |
| CE 8 | 3.9 | 60 | 13.4 | 22.7 | ○ | ○ | Δ | ◎ | X | X |

[1]CE: Comparative Example,
[2]IE: Inventive Example content.
*The content of the composition may be based on 14% of the solids As illustrated in Table 4 above, when the content of the silane compound satisfied the content range proposed by the present disclosure (Inventive Examples 8 to 11), all of the properties exhibited good or higher results.

Meanwhile, when the silane compound was added in a relatively small amount (Comparative Example 7), alkali resistance and fuel resistance exhibited poor results. When the silane compound was added in a relatively larger amount (Comparative Example 8), the film may become too dry to form an excessively hard film. Therefore, processed part corrosion resistance was deteriorated, blackening resistance was poor, and welding quality was poor.

Example 4

The trivalent chromium surface treatment solution composition according to Inventive Example 10 was used in the same manner as in Example 1 to obtain hot-dip galvanized steel sheet specimens on which a trivalent chromate inorganic film is formed, except that the silane compound illustrated in Table 5 was used.

Each of the specimens were evaluated for flat sheet corrosion resistance in the same manner as in Example 1, and the results are illustrated in Table 5.

TABLE 5

| | Content | | | | | | | | | | | Flat Sheet Corrosion Resistance |
|---|---|---|---|---|---|---|---|---|---|---|---|---|
| | A | B | C | D | E | F | G | H | I | J | K | |
| [1]IE 12 | 3.1 | 0 | 0 | 0 | 0 | 0 | 0 | 0 | 0 | 0 | 0 | ○ |
| IE 13 | 0 | 3.1 | 0 | 0 | 0 | 0 | 0 | 0 | 0 | 0 | 0 | ◎ |
| IE 14 | 0 | 0 | 3.1 | 0 | 0 | 0 | 0 | 0 | 0 | 0 | 0 | ○ |
| IE 15 | 0 | 0 | 0 | 3.1 | 0 | 0 | 0 | 0 | 0 | 0 | 0 | ◎ |
| IE 16 | 0 | 0 | 0 | 0 | 3.1 | 0 | 0 | 0 | 0 | 0 | 0 | ○ |
| IE 17 | 0 | 0 | 0 | 0 | 0 | 3.1 | 0 | 0 | 0 | 0 | 0 | ◎ |
| IE 18 | 0 | 0 | 0 | 0 | 0 | 0 | 3.1 | 0 | 0 | 0 | 0 | ○ |
| IE 19 | 0 | 0 | 0 | 0 | 0 | 0 | 0 | 3.1 | 0 | 0 | 0 | ○ |
| IE 20 | 0 | 0 | 0 | 0 | 0 | 0 | 0 | 0 | 3.1 | 0 | 0 | ○ |
| IE 21 | 0 | 0 | 0 | 0 | 0 | 0 | 0 | 0 | 0 | 3.1 | 0 | ◎ |
| IE 22 | 0 | 0 | 0 | 0 | 0 | 0 | 0 | 0 | 0 | 0 | 3.1 | ○ |
| IE 23 | 1.55 | 1.55 | 0 | 0 | 0 | 0 | 0 | 0 | 0 | 0 | 0 | ○ |
| IE 24 | 1.55 | 0 | 0 | 1.55 | 0 | 0 | 0 | 0 | 0 | 0 | 0 | ○ |
| IE 25 | 0 | 1.55 | 0 | 0 | 0 | 1.55 | 0 | 0 | 0 | 0 | 0 | ◎ |
| IE 26 | 0 | 0 | 0 | 1.55 | 0 | 1.55 | 0 | 0 | 0 | 0 | 0 | ○ |
| IE 27 | 0 | 0 | 0 | 0 | 1.55 | 0 | 1.55 | 0 | 0 | 0 | 0 | ○ |
| IE 28 | 0 | 0 | 0 | 0 | 0 | 1.55 | 0 | 0 | 0 | 1.55 | 0 | ◎ |
| IE 29 | 0 | 0 | 1.55 | 0 | 0 | 1.55 | 0 | 0 | 0 | 0 | 0 | ○ |
| IE 30 | 0 | 0 | 0 | 0 | 0 | 0 | 1.55 | 0 | 0 | 1.55 | 0 | ○ |
| IE 31 | 1.55 | 0 | 0 | 0 | 0 | 0 | 0 | 0 | 0 | 1.55 | 0 | ○ |
| IE 32 | 0 | 0 | 0 | 0 | 0 | 0 | 0 | 0 | 0 | 1.55 | 1.55 | ○ |
| IE 33 | 0 | 0 | 0 | 1.55 | 0 | 0 | 0 | 0 | 1.55 | 0 | 0 | ○ |
| IE 34 | 0 | 0 | 0 | 0 | 1.55 | 0 | 0 | 1.55 | 0 | 0 | 0 | ○ |
| IE 35 | 0 | 0 | 0 | 0 | 0 | 0 | 0 | 1.55 | 0 | 0 | 1.55 | ○ |
| IE 36 | 0 | 1.55 | 1.55 | 0 | 0 | 0 | 0 | 0 | 0 | 0 | 0 | ◎ |
| IE 37 | 0 | 0 | 1.55 | 0 | 0 | 0 | 0 | 0 | 0 | 0 | 1.55 | ○ |
| IE 38 | 0 | 0 | 0 | 0 | 0 | 0 | 1.55 | 0 | 1.55 | 0 | 0 | ○ |
| IE 39 | 0 | 0 | 0 | 0 | 1.55 | 0 | 0 | 1.55 | 0 | 0 | 0 | ○ |
| IE 40 | 0 | 1.55 | 0 | 1.55 | 0 | 0 | 0 | 0 | 0 | 0 | 0 | ○ |
| IE 41 | 0 | 1.55 | 0 | 0 | 0 | 0 | 0 | 0 | 0 | 0 | 1.55 | ◎ |
| IE 42 | 1.55 | 0 | 1.55 | 0 | 0 | 0 | 0 | 0 | 0 | 0 | 0 | ○ |

TABLE 5-continued

|  | Content | | | | | | | | | | | Flat Sheet Corrosion Resistance |
|---|---|---|---|---|---|---|---|---|---|---|---|---|
|  | A | B | C | D | E | F | G | H | I | J | K |  |
| IE 43 | 0 | 0 | 0 | 0 | 0 | 0 | 0 | 0 | 1.55 | 1.55 | 0 | ○ |
| IE 44 | 0 | 1.55 | 0 | 0 | 1.55 | 0 | 0 | 0 | 0 | 0 | 0 | ○ |
| IE 45 | 0 | 0 | 0 | 0 | 0 | 0 | 1.55 | 1.55 | 0 | 0 | 0 | ○ |

A: 2-(3,4-epoxycyclohexyl)-ethyl trimethoxysilane
B: 3-glycidoxypropyl trimethoxysilane
C: 3-glycidoxypropyl methyldiethoxysilane
D: 3-glycidoxypropyl triethoxysilane
E: N-2-(aminoethyl)-3-aminopropyl methyldimethoxysilane
F: N-2-(aminoethyl)-3-aminopropyl trimethoxysilane
G: N-2-(aminoethyl)-3-aminopropyl triethoxysilane
H: 3-aminopropyl trimethoxysilane
I: 3-aminopropyl triethoxysilane
J: 3-ureidopropyl trimethoxysilane
K: tetraethyl orthosilicate
[1]IE: Inventive Example
*The content of the composition may be based on 14% of the solids content.

As illustrated in Table 5 above, Inventive Examples 12 to 45 exhibited good or excellent flat sheet corrosion resistance. In particular, in the case of the test specimen treated with the trivalent chromium surface treatment solution composition prepared according to the composition of Inventive Example 41, white rust did not occur even after more than 144 hours, which exhibited the most excellent.

Example 5

Changes in Properties Depending on Content of Vanadium-Based Rust-Inhibiting and Corrosion-Resisting Agent Hot-dip galvanized steel sheet specimens on which a trivalent chromate inorganic film layer is formed was prepared in the same manner as in Example 1, except that chromium nitrate and chromium phosphate as a trivalent chromium compound; vanadium acetyl acetonate as a vanadium-based rust-inhibiting and corrosion-resisting agent; cobalt (III) nitrate as a cobalt-based rust-inhibiting and corrosion-resisting agent; and a silane mixture of tetraethyl orthosilicate and 3-glycidoxypropyl trimethoxysilane in a weight ratio of 1:1 as a silane coupling agent, were mixed in the amounts illustrated in Table 6 below (based on the solids content of the composition).

Flat sheet corrosion resistance, processed part corrosion resistance, blackening resistance, and alkali resistance of the prepared specimens were evaluated in the same manner as in Examples 1 and 3, and the evaluation results may be illustrated in Table 6.

As illustrated in Table 6 above, when the content of the rust-inhibiting and corrosion-resisting agent satisfied the content proposed by the present disclosure (Inventive Examples 46 to 48), all of the properties exhibited good or higher results.

Meanwhile, when the rust-inhibiting and corrosion-resisting agent was added in a relatively small amount (Comparative Example 9), all of the properties, except for blackening resistance and alkali resistance, exhibited poor results. When the rust-inhibiting and corrosion-resisting agent was added in a relatively larger amount (Comparative Examples 10 and 11), all of the properties, except for corrosion resistance, exhibited poor results.

Example 6

Changes in Properties Depending on Content of Cobalt-Based Rust-Inhibiting and Corrosion-Resisting Agent Hot-dip galvanized steel sheet specimens on which a trivalent chromate inorganic film layer is formed was prepared in the same manner as in Example 1, except that chromium nitrate and chromium phosphate as a trivalent chromium compound; vanadium acetyl acetonate as a vanadium-based rust-inhibiting and corrosion-resisting agent; cobalt (III) nitrate as a cobalt-based rust-inhibiting and corrosion-resisting agent; and a silane mixture of tetraethyl orthosilicate and 3-glycidoxypropyl trimethoxysilane in a weight ratio of 1:1 as a silane coupling agent, were mixed in the amounts illustrated in Table 7 below (based on the solids content of the composition).

TABLE 6

|  | Composition (wt %) | | | | Flat Sheet Corrosion Resistance | Processed Part Corrosion Resistance | Blackening Resistance | Alkali Resistance |
|---|---|---|---|---|---|---|---|---|
|  | Vanadium-based Rust-Inhibiting and Corrosion-Resisting Agent | $Cr^{3+}$ Compound | Silane Compound | Cobalt-based Rust-Inhibiting and Corrosion-Resisting Agent | | | | |
| [1]CE 9 | 5.3 | 65.5 | 3.0 | 26.2 | X | X | ◎ | ◎ |
| [2]IE 46 | 5.5 | 65.0 | 2.9 | 26.6 | ○ | ◎ | ◎ | ◎ |
| IE 47 | 10.5 | 60.0 | 2.9 | 26.6 | ○ | ◎ | ◎ | ◎ |
| IE 48 | 17.5 | 53.5 | 2.5 | 26.5 | ◎ | ◎ | ○ | ○ |
| CE 10 | 18.0 | 53.5 | 2.5 | 26.0 | ◎ | ◎ | ○ | X |
| CE 11 | 20.0 | 52.5 | 2.5 | 25.0 | ◎ | ◎ | X | X |

[1]CE: Comparative Example,
[2]IE: Inventive Example
*The content of the composition may be based on 14% of the solids content.

Flat sheet corrosion resistance, processed part corrosion resistance, and blackening resistance of the prepared specimens were evaluated in the same manner as in Examples 1 and 3, and the evaluation results are illustrated in Table 7.

As illustrated in Table 8 above, when the inorganic film layer was formed at 0.3 μm to 0.5 μm (Inventive Examples 52 to 57), all of the properties exhibited good or higher results. Meanwhile, when the inorganic film was formed to

TABLE 7

| | Composition (wt %) | | | | | | |
|---|---|---|---|---|---|---|---|
| | Cobalt-based Rust-Inhibiting and Corrosion-Resisting Agent | $Cr^{3+}$ Compound | Silane Compound | Vanadium-based Rust-Inhibiting and Corrosion-Resisting Agent | Flat Sheet Corrosion Resistance | Processed Part Corrosion Resistance | Blackening Resistance |
| [1]CE 12 | 13.5 | 75.0 | 3.0 | 8.5 | ⊚ | ○ | X |
| [2]IE 49 | 13.8 | 75.0 | 3.0 | 8.2 | ⊚ | ○ | ○ |
| IE 50 | 21.0 | 65.5 | 2.9 | 10.8 | ○ | ⊚ | ○ |
| IE 51 | 29.0 | 54.0 | 2.5 | 14.5 | ○ | ○ | ⊚ |
| CE 13 | 29.5 | 54.5 | 2.5 | 13.5 | X | X | ⊚ |
| CE 14 | 32.5 | 52.5 | 2.5 | 12.5 | X | X | ⊚ |

[1]CE: Comparative Example,
[2]IE: Inventive Example
*The content of the composition may be based on 14% of the solids content.

As illustrated in Table 7 above, when the content of the rust-inhibiting and corrosion-resisting agent satisfied the content proposed by the present disclosure (Inventive Examples 49 to 51), all of the properties exhibited good or higher results.

Meanwhile, when the rust-inhibiting and corrosion-resisting agent was added in a relatively small amount (Comparative Example 12), blackening resistance exhibited poor results. When the rust-inhibiting and corrosion-resisting agent was added in a relatively larger amount (Comparative Examples 13 and 14), corrosion resistance exhibited poor results.

Example 7

Change in Properties Depending on Thickness of Film Layer and Drying Temperature Hot-dip galvanized steel sheet specimens on which a trivalent chromate inorganic film layer is formed was prepared in the same manner as in Example 1, except that a thickness of the inorganic film, after drying, and a PMT temperature in the drying process are as illustrated in Table 8 below.

Alkali resistance, fuel resistance, weldability, flat sheet corrosion resistance, corrosion resistance, and blackening resistance of the prepared specimens were evaluated in the same manner as in Examples 1 and 3, and the evaluation results are illustrated in Table 8.

be relatively thin (Comparative Example 15), all of the properties, except for weldability, exhibited moderate results (Δ). Meanwhile, when the inorganic film was formed to be relatively thick (Comparative Example 16), all of the properties, except for weldability, exhibited good or higher results, but weldability exhibited poor. In this regard, a thicker film exceeding 0.5 μm is not preferable and required in view of economy.

In addition, as illustrated in Table 8 above, when the inorganic film layer was formed by setting a drying temperature of the inorganic film to 50 to 60° C. (Inventive Examples 52 to 54 and 56), all of the properties exhibited good or higher results.

When the drying temperature was relatively low (Inventive Example 55), sufficient drying was not carried out, and alkali resistance and fuel resistance exhibited moderate results (Δ). Meanwhile, when the drying temperature was relatively high (Inventive Example 57), the steel sheet was not sufficiently cooled during the cooling process (air cooling) in air, and, consequently, blackening resistance exhibited moderate results (Δ) due to the condensation phenomenon by a packaging operation.

While example embodiments have been illustrated and described above, it will be apparent to those skilled in the art that modifications and variations could be made without departing from the scope of the present disclosure as defined by the appended claims.

TABLE 8

| | Thickness Of Film Layer (μm) | Dry Temp. (° C.) | Alkali Resistance | Fuel Resistance | Weldability | Flat Sheet Corrosion Resistance | Processed Part Corrosion Resistance | Blackening Resistance |
|---|---|---|---|---|---|---|---|---|
| [1]CE 15 | 0.1 | 50 | Δ | Δ | ⊚ | Δ | X | Δ |
| [2]IE 52 | 0.3 | 50 | ⊚ | ⊚ | ⊚ | ⊚ | ⊚ | ⊚ |
| IE 53 | 0.4 | 50 | ⊚ | ⊚ | ⊚ | ⊚ | ⊚ | ⊚ |
| IE 54 | 0.5 | 50 | ⊚ | ⊚ | ⊚ | ⊚ | ⊚ | ○ |
| CE 16 | 0.8 | 50 | ⊚ | ⊚ | Δ | ⊚ | ⊚ | ○ |
| IE 55 | 0.4 | 40 | Δ | Δ | ⊚ | ○ | ○ | ○ |
| IE 56 | 0.4 | 60 | ⊚ | ⊚ | ⊚ | ⊚ | ⊚ | ⊚ |
| IE 57 | 0.4 | 70 | ⊚ | ⊚ | ⊚ | ⊚ | ⊚ | Δ |

[1]CE: Comparative Example,
[2]IE: Inventive Example

The invention claimed is:

1. A surface treatment solution composition for forming an inorganic film, comprising:
   10 to 30% by weight of a trivalent chromium compound containing chromium phosphate (A) and chromium nitrate (B) and satisfying a content ratio A/(A+B) of 0.3 to 0.6 (based on a solution having a solid content of 28.6% by weight);
   5 to 50% by weight of a silane compound (based on a solution having a solid content of 1.27% by weight);
   0.2 to 3% by weight of a vanadium-based rust-inhibiting and corrosion-resisting agent;
   0.5 to 5% by weight of a cobalt-based rust-inhibiting and corrosion-resisting agent; and
   12 to 84.3% by weight of water.

2. The surface treatment solution composition according to claim 1, wherein the silane compound is one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureidopropyl trimethoxysilane, and tetraethyl orthosilicate.

3. The surface treatment solution composition according to claim 1, wherein the vanadium-based rust-inhibiting and corrosion-resisting agent is one or more selected from the group consisting of vanadium pentoxide ($V_2O_5$), metavanadium acid ($HVO_3$), ammonium metavanadate, sodium metavanadate, vanadium oxychloride ($VOCl_3$), vanadium trioxide ($V_2O_3$), vanadium dioxide ($VO_2$), vanadium oxysulfate ($VOSO_4$), vanadium oxyoxalate [$VO(COO)_2$], vanadium oxyacetyl acetonate [$VO(OC(CH_3)=CHCOCH_3))_2$], vanadium acetyl acetonate [$V(OC(CH_3)=CHCOCH_3))_3$], vanadium trichloride ($VCl_3$), vanadium sulfate ($VSO_4.8H_2O$), vanadium dichloride ($VCl_2$), and vanadium oxide (VO).

4. The surface treatment solution composition according to claim 1, wherein the cobalt-based rust-inhibiting and corrosion-resisting agent is one or more selected from the group consisting of cobalt (II) nitrate, cobalt (II) sulfate, cobalt (II) acetate, cobalt (II) oxalate, cobalt (III) nitrate, cobalt (III) acetate, cobalt (III) oxalate, cobalt (IV) chloride, cobalt (III) oxide, and cobalt (IV) oxide.

5. A manufacturing method for a surface-treated alloyed hot-dip galvanized steel sheet, comprising:
   coating the surface treatment solution composition of claim 1 on an alloyed hot-dip galvanized steel sheet on which an alloyed hot-dip galvanized layer is formed; and
   drying the coated surface treatment solution composition to form a trivalent chromate inorganic film layer.

6. The manufacturing method according to claim 5, wherein the surface treatment solution composition is coated to have a thickness of 2.14 to 3.57 μm.

7. The manufacturing method according to claim 5, wherein the coating is performed by any one process selected from the group consisting of a roll coating process, a spraying process, an immersion process, a spray squeezing process, and an immersion squeezing process.

8. The manufacturing method according to claim 5, wherein the drying is performed at a temperature of 50 to 60° C. on the basis of a Peak Metal Temperature (PMT) of a steel sheet.

9. The manufacturing method according to claim 5, wherein the drying is performed in a hot-air drying furnace or an induction heating furnace.

10. The manufacturing method according to claim 9, wherein the hot-air drying furnace has an internal temperature of 100 to 200° C.

11. The manufacturing method according to claim 9, wherein the induction heating furnace is applied with an electric current of 1000 to 3500 A.

12. The manufacturing method according to claim 5, further comprising air-cooling the trivalent chromate inorganic film layer.

13. The manufacturing method according to claim 5, wherein the manufacturing method is a continuous process, wherein the continuous process has a speed of 80 to 100 mpm.

* * * * *